US007645987B2

(12) United States Patent
Chang et al.

(10) Patent No.: US 7,645,987 B2
(45) Date of Patent: Jan. 12, 2010

(54) ACOUSTIC DESORPTION MASS SPECTROMETRY

(75) Inventors: Huan-Cheng Chang, Taipei (TW); Chung-Hsuan Chen, Taipei (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 11/234,051

(22) Filed: Sep. 22, 2005

(65) Prior Publication Data

US 2007/0131871 A1 Jun. 14, 2007

(51) Int. Cl.
*B01D 59/44* (2006.01)
*H01J 49/00* (2006.01)

(52) U.S. Cl. ....................... 250/288; 250/281; 250/282; 250/251

(58) Field of Classification Search ................. 250/288, 250/282, 281, 251; 435/6; 436/173
See application file for complete search history.

(56) References Cited

U.S. PATENT DOCUMENTS

| | | | | |
|---|---|---|---|---|
| 6,288,390 | B1 * | 9/2001 | Siuzdak et al. | 250/288 |
| 6,777,673 | B2 | 8/2004 | Chang et al. | |
| 6,809,315 | B2 | 10/2004 | Ellson et al. | |
| 6,855,925 | B2 | 2/2005 | Ellson et al. | |
| 2002/0094582 | A1 * | 7/2002 | Williams et al. | 436/180 |
| 2002/0109084 | A1 * | 8/2002 | Ellson et al. | 250/288 |
| 2002/0158196 | A1 * | 10/2002 | Berggren et al. | 250/288 |
| 2004/0007673 | A1 * | 1/2004 | Coon et al. | 250/424 |

OTHER PUBLICATIONS

Golovlev et al.,"Laser-induced acoustic desorption of electrons and ions", Appl. Phys. Lett. 71(6), Aug. 11, 1997.*

Gonthiez et al., "VUV laser photoionization of laser-stimulated desorbed species", International Conference on Laser Ablation, Jul. 19-23, 1999.*

Shapira et al.,"Phase-Sensitive detection of electron beam-induced desorption from ZnO", J. Appl. Phys. 51(1), p. 710-714, Jan. 1980.*

Kolomenski et al.,"UV Laser Excitation of Broadband Surface Acoustic Wave Pulses in Silicon Near the Ablation Threshold", Ultrasonics symposium, pp. 651-654, 1994.*

Karas et al. "Laser Desorption Ionization of Proteins with Molecular Masses Exceeding 10000 Daltons". Anal. Chen. 60:2299-2301, 1988.

Lindner. "On the desorption of electrosprayed organic compounds from supporting metal foils by laser induced pressure waves". International Journal of Mass Spectrometry and Ion Processes 103:203-218, 1991.

Wong et al. "Multiple Charging in Electrospray Ionization of Poly-(ethylene glycols)". J. Phys. Chem. 92:546-550, 1988.

J. Larry Campbell et al., "Analysis of Saturated Hydrocarbons by Using Chemical Ionization Combined with Laser-Induced Acoustic Desorption/Fourier Transform Ion Cyclotron Resonance Mass Spectrometry", *Anal. Chem*, vol. 76, No. 4, pp. 959-963 (Feb. 15, 2004).

(Continued)

*Primary Examiner*—Thanh X Luu
*Assistant Examiner*—Francis M Legasse, Jr.
(74) *Attorney, Agent, or Firm*—Fish & Richardson P.C.

(57) ABSTRACT

A method for producing gas phase molecules includes providing a sample of molecules, the sample being characterized by a charge distribution, and directing acoustic radiation at the sample of molecules to desorb at least some of the molecules from the sample such that the desorbed molecules have a charge distribution that is substantially the same as the charge distribution of the sample of molecules.

17 Claims, 6 Drawing Sheets

OTHER PUBLICATIONS

V.V. Golovlev et al, "Laser-induced acoustic desorption", *International Journal of Mass. Spectrometry and Ion Processes*, vol. 169/170, pp. 69-78 (1997).

V.V. Golovlev et al., "Laser-induced acoustic desorption of electrons and ions", *Appl. Phys. Lett.*, vol. 71, No. 6, pp. 852-854 (Aug. 11, 1997).

Buko Lindner et al., "Laser Desorption Mass Spectrometry of Nonvolatiles under Shock Wave Conditions", *Anal. Chem.*, vol. 57, pp. 895-899 (1985).

Wen-Ping Peng et al., "Averaging peak-to-peak voltage detector for absolute mass determination of single particles with quadrupole ion traps", *Review of Scientific Instruments*, vol. 76, pp. 023108-1-023108-5 (2005).

Wen-Ping Peng et al., "Measuring Masses of Single Bacterial Whole Cells with a Quadrupole Ion Trap", *J. Am. Chem. Soc.*, vol. 126, pp. 11766-11767 (2004).

James Perez et al., "Laser-induced acoustic desorption/chemical ionization in Fourier-transform ion cyclotron resonance mass spectrometry", *International Journal of Mass. Spectrometry*, vol. 198, pp. 173-188 (2000).

Christopher J. Petzold et al., "Gas-phase Reactions of Charged Phenyl Radicals with Neutral Biomolecules Evaporated by Laser-induced Acoustic Desorption", *Journal of American Society for Mass. Spectrometry*, vol. 13, pp. 192-194 (2002).

Kolomenskii, Al. A. et al. "Interaction of laser-generated surface acoustic pulses with fine particles: Surface cleaning and adhesion studies" Journal of Applied Physics, vol. 84, No. 5, Sep. 1998.

* cited by examiner

ACOUSTIC DESORPTION MASS SPECTROMETRY

TECHNICAL FIELD

This invention relates to mass spectrometry, and more particularly to generating gas phase charged molecules for mass spectrometry analysis.

BACKGROUND

Mass spectrometry enables the identification of molecules according to their mass to charge ratio (often represented as m/z or m/Ze). During mass spectrometry analysis the behavior of charged molecules in an electric field is examined. The behavior of the charged molecules enables the determination of their mass-to-charge ratios. For example, in quadrupole ion-trap mass spectrometry charged molecules are trapped by the ion trap. An electric field is applied to the trapped molecules causing them to behave in a manner that is indicative of their mass-to-charge ratio (represented as m/z or m/Ze). By determining the mass-to-charge ratios of the trapped molecules, the mass of the molecules may also be determined, thereby enabling identification of the molecule.

To produce charged molecules for mass spectrometry analysis, conventional mass spectrometry techniques ionize the molecules that are to be studied, and provide at least some of those charged molecule in gas phase form. Techniques for ionizing and producing gas phase molecules, such as Matrix Assisted Laser Desorption Ionization (MALDI), may cause matrix molecules in the samples to be introduced into the gas phase of the molecules that are examined. Additionally, the ionization process often fragments, and sometimes destroys, the target molecules, particularly when those molecules are large biological molecules. Additionally, performing an ionization procedure on the sample of molecules often adds complexity to the mass spectrometry process.

SUMMARY

In one aspect, a method for producing gas phase molecules includes providing a sample of molecules, the sample being characterized by a charge distribution, and directing acoustic radiation at the sample of molecules to desorb at least some of the molecules from the sample such that the desorbed molecules have a charge distribution that is substantially the same as the charge distribution of the sample of molecules.

Embodiments may include one or more of the following:

Directing the acoustic radiation includes applying energy to a substrate to induce acoustic waves in the substrate.

The sample is placed on the substrate. In some embodiments, the substrate comprises silicon.

The sample is placed on one surface of the substrate, and the energy is applied to another surface of the substrate.

Applying energy to the substrate comprises generating electromagnetic radiation, and directing the electromagnetic radiation at a surface of the substrate to induce acoustic waves in the substrate. The electromagnetic radiation can include laser radiation.

Applying energy comprises generating an electron beam, and directing the electron beam at a surface of the substrate to induce acoustic waves in the substrate.

Applying energy comprises causing mechanical agitation at a surface of the substrate to induce acoustic waves in the substrate. For example, a piezoelectric device may be used to cause mechanical agitation.

Directing acoustic radiation includes generating acoustic waves using, for example, a continuous sonic source, an ultrasound source, and/or a pulsed source.

Directing acoustic radiation is performed without concurrently directing ionizing radiation at the molecules.

In some embodiments, the method further includes performing mass spectrometry analysis on the desorbed molecules. The mass spectrometry analysis can include time-of-flight mass spectrometry analysis, quadrupole mass spectrometry analysis, ion trap mass spectrometry analysis, magnetic sector mass spectrometry analysis, Fourier-transform ion cyclotron resonance mass spectrometry analysis, and/or ion mobility mass spectrometry analysis.

In another aspect, an apparatus to produce gas phase molecules includes a receptacle to hold a sample of molecules, the sample being characterized by a charge distribution, and an acoustic source configured to direct acoustic radiation at the sample of molecules to cause at least some of the molecules to desorb from the sample. The desorbed molecules have a charge distribution that is substantially the same as the charge distribution of the sample of molecules.

In another aspect, a method for producing gas phase molecules includes providing a sample of molecules, generating acoustic radiation using a continuous sonic source, an ultrasound source, and/or a pulsed source, and directing the acoustic radiation at the sample of molecules to desorb at least some of the molecules from the sample. The acoustic radiation is incident on the sample of molecules. The method also includes ionizing the molecules.

In another aspect, an apparatus to produce gas phase molecules includes a receptacle to hold a sample of molecules, and an acoustic radiation generator configured to direct acoustic radiation at the sample of molecules to cause at least some of the molecules to desorb from the sample. The acoustic radiation generator includes, for example, a continuous sonic source, an ultrasound source, and/or a pulsed source.

In another aspect, a method for producing gas phase molecules includes providing a sample of molecules, and directing acoustic radiation at the sample of molecules to desorb at least some of the molecules from the sample without performing an ionization procedure on the sample. At least some of the desorbed molecules have a charge. Mass spectrometry analysis is performed on the desorbed molecules.

In another aspect, an apparatus to produce gas phase molecules includes a receptacle to hold a sample of molecules, and an acoustic source configured to direct acoustic radiation at the sample of molecules to cause at least some of the molecules to desorb from the sample. At least some of the desorbed molecules have a charge. A mass spectrometer configured to analyzed the desorbed molecules may be used. The sample is exposed to acoustic radiation without being subjected to an ionization procedure.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
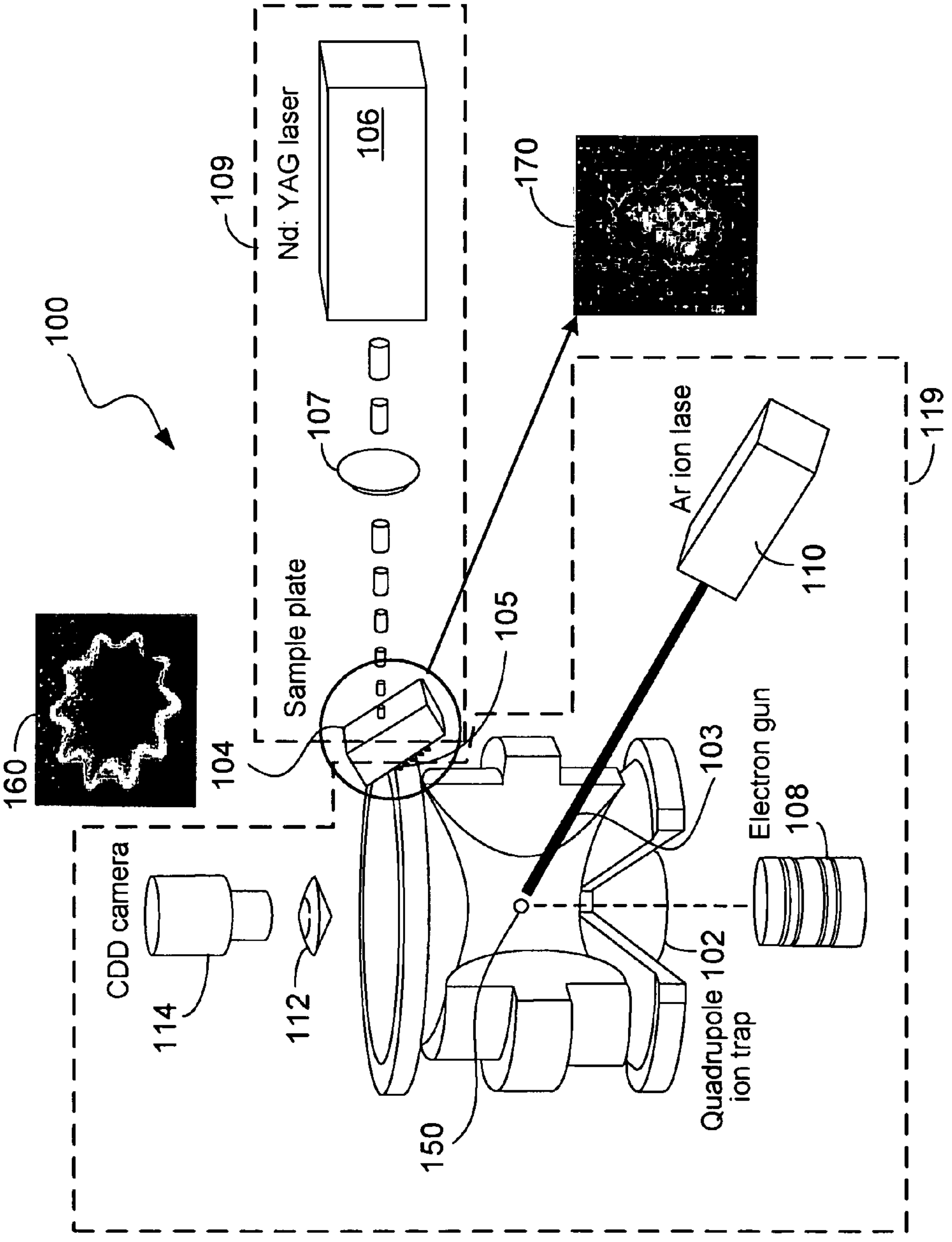
FIG. 1 is a front-side perspective of a schematic diagram of an exemplary embodiment of a mass spectrometer apparatus that uses acoustic desorption.

FIG. 1 shows a front-side of an exemplary apparatus 100 used for performing mass spectrometry analysis on molecules that are desorbed (i.e., released from the sample provided) using acoustic radiation.

Figure 2:
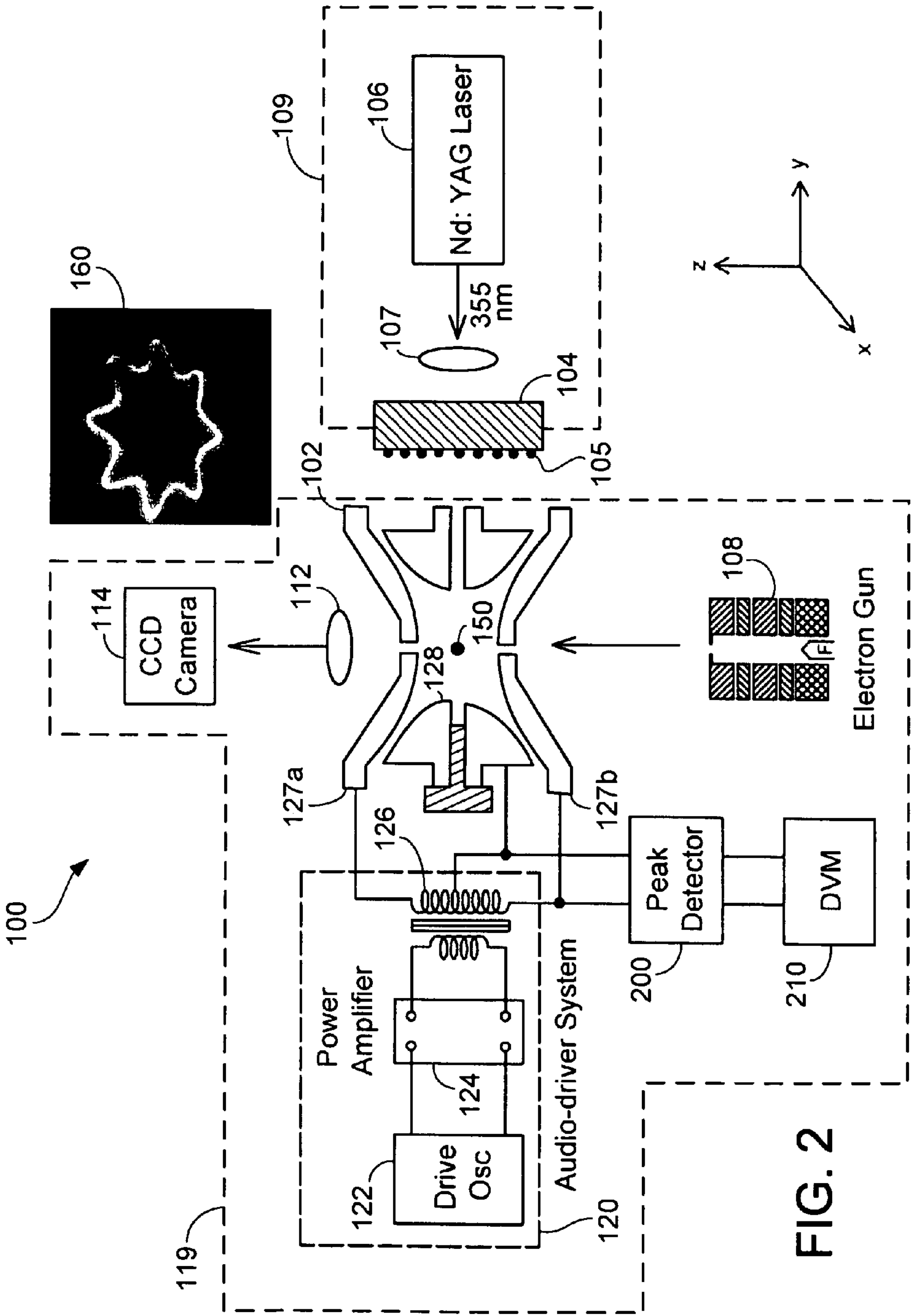
FIG. 2 is a schematic block diagram of the apparatus shown in FIG. 1.

FIG. 2 shows a block diagram schematic of the apparatus shown in FIG. 1 (for the sake of simplicity, some parts shown in FIG. 1 are not shown in FIG. 2). As shown in FIGS. 1 and 2, the apparatus 100 includes an acoustic source 109 that directs acoustic energy at a sample of molecules 105 to desorb at least some of the molecules in the sample. The desorbed molecules thus form a gas phase of molecules that is analyzed by the mass spectrometer measurement and detection instrumentation 119 of the apparatus 100. As will become apparent below, at least some of the desorbed molecules have a charge. Further, in some embodiments, the charge distribution of the desorbed molecules is substantially the same as the charge distribution of the sample 105.

To produce a gas phase of molecules, a receptacle receives a sample of molecules 105. The sample of molecules 105 is disposes at a location proximate to the mass spectrometry instrumentation 119 that enables some of the molecules to be released and directed into the mass spectrometry measurement and detection instrumentation 119. In FIG. 1 the sample 105 is disposed near an opening of a channel or conduit (not shown) of the Quadrupole Ion Trap (QIT) 102 that leads to the inner region 103 inside QIT 102 where mass spectrometry analysis is performed.

Acoustic radiation produced by acoustic source 109 is then directed onto the sample of molecules 105. Consequently, some of the molecules in the sample 105 acquire enough kinetic energy to enable them to be desorbed, or released, from the bulk of the sample 105. Those desorbed molecules are directed into the inner region 103 of the QIT 102.

The production of gas phase molecules for mass spectrometry analysis using acoustic radiation generally does not require ionization of the sample. This is because in any given sample of molecules there will be at least some portion of molecules that are already ionized and thus have a positive or negative charge (such molecules that already have a charge without having had to undergo an ionization process are sometimes referred to as “born-charge” molecules). This is true also of samples that chemically would be considered to be non-ionic (i.e., neutral). While the concentration of charged molecules may vary greatly from a small percentage of born-charge molecules in a neutral sample, to a large concentration of charged molecules in an ionic sample, there will be at least some molecules in every sample that are charged. Thus, any given sample of molecules will have a characteristic molecular charge distribution.

When acoustic radiation is applied to a sample of molecules, the acoustic waves break the surface bonds between the molecules, and thereby cause molecules to be released from the sample 105. For example, in laser-induced acoustic desorption, discussed more particularly below, the frequency range of the induced waves is similar to the range of the surface bond vibrational frequencies of the molecules of the material in which the acoustic waves are induced. As a result, laser-induced acoustic waves enable efficient breaking of molecular surface bonds. Additionally, the compatibility between laser-induced acoustic wave frequencies and surface bond vibrational frequencies also avoids intermediate energy transfers, and thus avoids energy conversion losses and inefficiencies, that generally occur with conventional techniques for producing gas phase molecules. Further, acoustic desorption enables soft desorption of molecules without fragmentation of the molecules. In some embodiments, the resultant desorbed molecules will have a charge distribution that is substantially the same as the charge distribution for the molecules in the sample 105.

Although the use of acoustic desorption without any other ionization may produce only a small quantity of gas phase molecules, for the purposes of mass spectrometry analysis even a small quantity of charged molecules in the gas phase is sufficient since the mass spectrometer apparatus only requires a small number of charged molecules to properly identify the m/z value associated with those molecules. Although the percentage of charged ions relative to the number of neutral molecules/particles is small, the overall detection efficiency can be similar or better, in some cases, than the detection of efficiency of mass spectrometry that uses an ionization device. In mass spectrometers that use an ionization device, the ionization efficiency is typically very low when the mass spectrometry analysis is performed for biomolecules or bio-particles. For example, the ionization efficiency for biomolecules when using MALDI or electrospray ionization is typically less than 0.0001. For some large biomolecules, the efficiency can be close to zero. For example, large polysaccharide molecules (M>100,000 Daltons) cannot be properly ionized using conventional ionization devices.

Further, although acoustic desorption causes non-charged molecules to also be released into the gas phase plume, the presence of non-charged molecules in the gas phase does not skew the mass spectrometry results since the non-charged molecules are not detected by a charged particle detector. In addition, non-charged molecules cannot be trapped in an ion trap device.

Acoustic desorption, as described herein, may be performed on any type of molecule, including:

1) Liquid samples and amorphous materials that typically do not have enough gas vapor at the mass spectrometer operational temperature for conventional gas sample analysis with a mass spectrometer. Such liquid samples and amorphous materials include liquid crystals and ionic liquids;
2) Analytes trapped inside solid state samples such as hydrogen trapped in a metal foil;
3) Adsorbates on a substrate such as free radicals on a catalytic metal surface;
4) Biomolecules such as proteins, nucleic acid fragments, polysaccharides, lipids, glycoproteins, hormones, oligonucleotides and antibodies;
5) Biomolecular complexes such as DNA-protein complexes and protein-protein complexes;

6) Organic polymers such as polystyrene and poly(ethylene glycol);
7) Nano-sized and micro-sized particles including quantum dots and polystyrene particle size standards;
8) Clusters and/or aerosols on surfaces, especially micro/nano particles collected on a substrate for environmental applications;
9) Organelles such as chromosomes and mitochondria;
10) Whole cells such as viruses, bacteria and red blood cells;
11) Microplasma; and
12) Metal and inorganic clusters and particles.

Other types of molecules may also be acoustically desorbed and be subjected to mass spectrometry analysis as described herein.

Turning back to FIGS. 1 and 2, the acoustic source 109 is configured to cause acoustic desorption of the molecules of the sample 105 using a technique called Laser-Induced Acoustic Desorption (LIAD). As shown, the acoustic source 109 includes an electromagnetic source, such as a pulsed UV laser 106, that applies energy to substrate 104 to induce acoustic waves in the substrate. A suitable pulsed UV laser 106 is a frequency doubled Nd:YAG laser. The acoustic source 109 also includes the substrate 104. The sample 105 is placed on the surface of the substrate that is disposed proximate to the opening into the QIT 102. Laser illumination is focused on the substrate using focusing lens 107. The illumination of the laser 106 is directed to the side of substrate that does not have the sample 105 placed on it. Thus, the sample 105 does not come directly in contact with the laser illumination, and is therefore protected from laser radiation exposure which can damage it.

Figure 3:
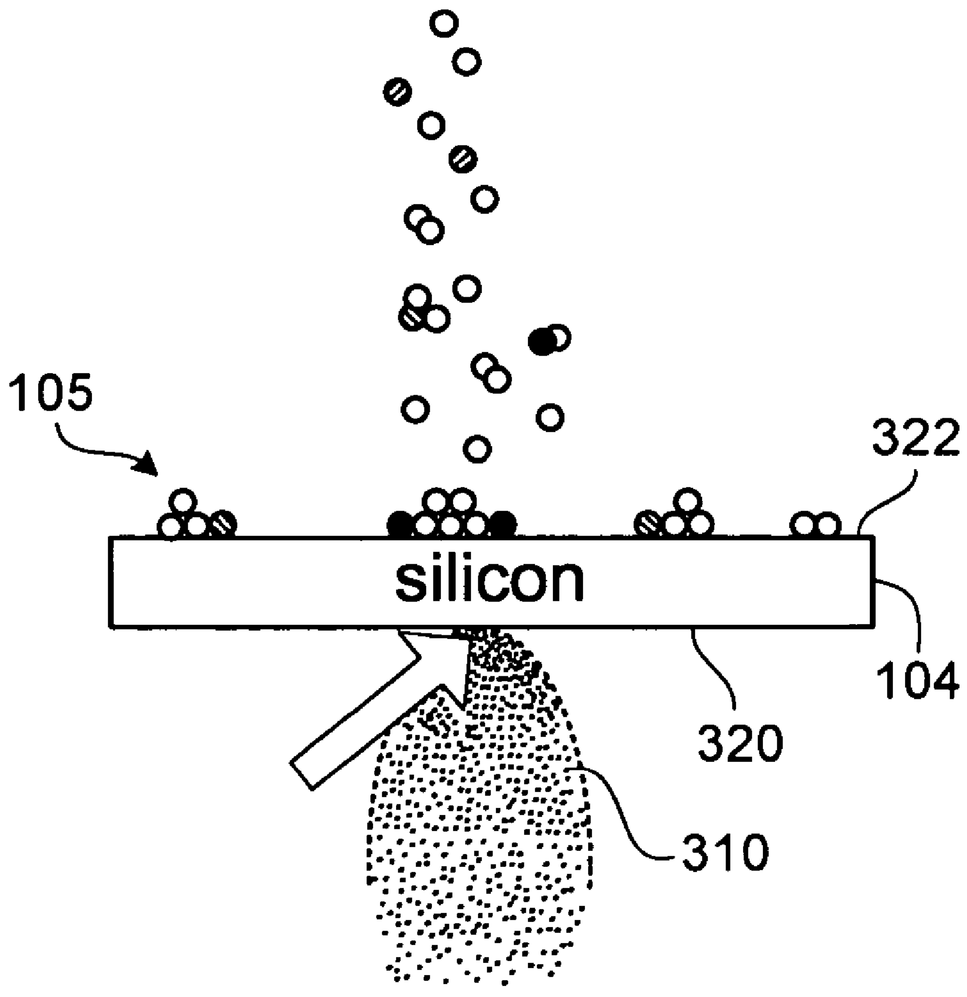
FIG. 3 is a diagram illustrating the molecule desorption process using the Laser-Acoustic Induced Desorption technique.

FIG. 3 is a diagram illustrating the molecule desorption process using the laser-Induced acoustic desorption technique. As shown, the laser illumination 310 from laser source 106 strikes surface 320 of the substrate 104 on which the sample 105 was placed. As can be seen, the sample 105 is placed on the surface 322 which does not come in direct contact with the laser illumination 310.

The power level of the laser is such that the laser fluence (i.e., the laser energy density) is above the ablation threshold (i.e., the point at which absorbed laser energy is sufficient to break the bonds between molecules of the material absorbing it). The absorbed laser illumination thus causes the bonding of the matter forming the substrate 104 to break down. Shown in the inset 170 of FIG. 1 is the laser ablated spot with an approximate radius of 1 mm on the surface 320 of the substrate 104.

As the bonding of the matter of substrate 104 breaks down, shockwaves are generated which propagate through the substrate until they reach surface 322. There the energy of the propagating waves is transferred to at least some of the molecules of the sample 105, whereupon the energy acquired by the molecules causes some of them to be desorbed from the bulk of the sample 105. As can be further seen from FIG. 3, some of the desorbed molecules include neutral molecules (shown as white circled), while some of the desorbed molecules are charged molecules (shown as shaded circles). Only the desorbed molecules that are charged will be trapped in the electric field of an ion trap mass spectrometer, while the neutral molecules will not be affected by that electrical field. Although not shown, an acoustic transducer can be used to monitor the acoustic wave production, for example, to enable monitoring the acoustic desorption process.

To facilitate the generation of shock waves in the substrate, the substrate 104 is constructed from materials having an ablation threshold that is lower than the fluence level of the laser used. A suitable material for use as a substrate is silicon. Other suitable materials having a suitable ablation threshold, or other characteristics that make them suitable for inducing shock waves in the material, may also be used.

In some embodiments (not shown) the acoustic source 109 includes a particle beam generator (such as an electron beam). The particle beam thus induces in the substrate acoustic waves that desorb the molecules of the sample 105. As with laser illumination, the irradiation of a particle beam on the substrate causes matter in the substrate to break down when the beam's fluence level exceeds the substrate's ablation threshold value. As a result, shock waves are generated in the substrate, which in turn propagate through the substrate. Once the shock waves reach the surface on which the molecules of the sample are deposited, the shock waves desorb at least some of the molecules.

In some embodiments (not shown), the acoustic source 109 includes a piezoelectric device that cause mechanical agitation. In such embodiments, a controller sends electrical signals to the piezoelectric device that cause mechanical displacements of the piezoelectric device in accordance with the electric signal level actuating the device. The piezoelectric device is positioned proximate the surface of the substrate 104 opposite the surface on which the sample of molecules is deposited. When the piezoelectric device is mechanically displaced, it strikes the substrate or plate, and thereby causes acoustic, or shock waves, to be generated and propagated through the substrate. Those propagating waves reach the surface of the substrate on which the molecule sample is deposited, and cause at least some of the molecules to be desorbed from the sample. Other type of devices that can be actuated to cause mechanical agitation that is transferred to the substrate may also be used.

In some embodiments, acoustic wave generators may be used to generate acoustic waves that are projected directly onto the sample. Thus, the generated acoustic waves do not propagate through another medium, and their generation does not involve an intermediary process of inducing shock waves in the substrate through incident beams (particle beams or optical beams), or causing mechanical agitation to produce vibrations in the substrate. In some embodiments, the acoustic wave generator may be a continuous sonic source, an ultrasound source, and/or a pulsed acoustic source. Thus, generated acoustic waves are projected onto the molecules of the sample sitting on a receptacle or a substrate. As the acoustic waves strike the sample, they transfer acoustic energy to the molecules. As a result, at least some of the molecules acquire enough kinetic energy to enable them to desorb from the sample. At least some of the desorbed molecules will be charged molecules, thus enabling mass spectrometry analysis of those molecules. In some embodiments, the desorbed molecules will thus have a charge distribution that is substantially the same as the charge distribution of the molecules of sample 105.

Although use of acoustic desorption technique as described herein does not require that an ionization process be used to ionize the molecule in sample 105, under some circumstances an ionization of the sample 105 may nevertheless be performed. For example, in some circumstances a larger quantity of charged molecules may be required. For instance, where acoustic desorption is performed by projecting incident acoustic energy directly onto the sample 105 (using, for example, a continuous sonic source, an ultrasound source, and/or a pulsed acoustic source), further ionization may be performed using conventional ionization techniques. One such ionization technique is to use an electron gun to generate an electron beam that is directed at the molecules to produced charged molecules. Other ways to charge the molecules of the sample include using devices that perform collision process or a photoionization process, devices that perform photon-induced charge transfer, devices that perform electron attachment ionization techniques, devices that perform ion attachment ionization techniques, etc. In some embodiments, the acoustic radiation itself causes the molecules in the sample to become ionized. Ionization of the molecules in the sample 105 can be performed prior to, during, or after, the application of the acoustic energy to desorb the molecules.

Returning to FIG. 1, the desorbed charged molecules are directed to the QIT 102 in the mass spectrometry measurement and detection instrumentation 119. QIT 102 may be any commercially available QIT mass analyzer such as, for example, the Jordan C-1251 QIT. The QIT 102 produces, through the action of several electrodes, including ring electrode 128 and end-cap electrodes 127*a* and 127*b*, a 3D quadrupole potential field that traps charged molecules into an oscillatory trajectory. The exact motion of a charged molecule 150 introduced into the trap depends on the applied voltages, driving frequency, and the individual mass-to-charge value of the trapped molecule (although reference is made to one molecule, or particle, it will be understood that more than one molecule may be inside the QIT 102). Thus, as will become apparent below, the mass-to-charge value of a trapped charged molecule may be determined based on its motion and the value of the QIT's applied voltages and driving frequency.

The desorbed sample molecules may be introduced into the trap either through the gap between the ring and end-cap electrodes, or through the holes on the ring electrode. To ensure that the charged molecules entering the QIT remain inside it, a buffer gas damps the motion of the charged molecules as they pass through the QIT 102. One such buffer gas is helium maintained at a pressure of approximately 1 mTorr inside the QIT 102. Other type of gases and/or other damping media, as well as other damping techniques, may be employed to facilitate trapping the charged molecules inside QIT 102.

With reference to FIG. 2, once a charged molecule 150 reaches the QIT 102, an AC voltage source 120 is applied to create an electric field inside the QIT 102 that traps the charged molecule 150 in an oscillatory motion.

In the illustrated embodiment shown in FIG. 2, the AC voltage source 120 includes a driver oscillator 122 that generates voltages having an adjustable amplitude and/or an adjustable frequency. For example, the driver oscillator 122 may be a synthesized function generator that generates sinusoidal voltage signals having frequencies in the audio and radio frequency range (e.g., 100 Hz-2 MHz), and adjustable amplitude levels. The voltage signal generated by the driver oscillator 122 may be automatically controlled by a processor-based device. Additionally and/or alternatively, the frequency and amplitude of the signal generated by driver oscillator 122 may be manually controlled by a user.

Coupled to the driver oscillator 122 is a power amplifier 124 that drives the input terminals of a transformer 126. A voltage signal $V_{ac}$ having an adjustable amplitude and frequency is thus generated at the output terminals of the transformer 126. These output terminals are coupled to the end-cap electrodes 127*a* and 127*b*. It will be appreciated that other type of electrical configurations may be used to create, inside the QIT 102, electric fields required for mass spectrometry analysis of the charged molecule 150. For example, in addition to the voltage $V_{ac}$ that is applied between the end-caps 127*a* and 127*b*, a small DC voltage may be applied between the end-cap electrodes 127*a* and 127*b* to counteract gravitational forces. A description of various configurations for creating an electric field inside a QIT, and a description of the operation of a QIT, are provided, for example, in U.S. Pat. No. 6,777,673, entitled "Ion Trap Mass Spectrometer", the entire content of which is hereby incorporated by reference.

When the charged molecule 150 is held by the electric field created inside QIT 102, the frequency of the driving voltage of QIT 102 is manually or automatically adjusted until resonance conditions within the QIT 102 are achieved. When this occurs the ratio of the driving frequency, Ω, of the driving voltage signal and the radial frequency $\omega_r$ (i.e., the charged molecule's oscillatory frequency within the trap 102) is an integer value, n, and the radial trajectory of the charged molecule is observed to form a stationary pattern. One such pattern is the star pattern seen in the inset 160 in FIGS. 1 and 2. The number of branches, n, of the star pattern equals the ratio of the frequency of the driving voltage and the ionized molecule's radial frequency such that, under resonance conditions, $\Omega = n\omega_r$.

As more particularly explained in U.S. patent application Ser. No. 11/134,616, the content of which is hereby incorporate by reference in its entirety, the observed characteristics, for example, the number of branches n of the star pattern, are related to the mass-to-charge value of the particle, and to the frequency and amplitude of the driving voltage. Accordingly, the mass-to-charge value m/Ze for the charged molecule 150 may thus be determined when resonance conditions at the QIT 102 are met.

However, the value m/Ze in and of itself does not provide definitive information about the mass, m, of the particle 150 since there are infinite combinations of m and Z that would yield the same m/Ze value. One way, therefore, to determine the mass of the molecule 150 is to produce several different charge states for the same molecule 150, and thus produce several different m/Ze values for the same molecule 150. Since for those m/Ze values generated the mass m of molecule 150 remains the same, it is possible on the basis of the plurality of generated m/Ze values, corresponding to the plurality of charge states, to determine the mass m.

To generate a plurality of charge states for the molecule 150 required for subsequently determining the mass m of the molecule, a charging module, such as an electron gun 108 shown in FIGS. 1 and 2 may be used. The electron gun 108 produces an electron beam emanating, for example, from a hot tungsten filament. This beam is directed through one of the holes on one of the end-cap electrodes 127*a*, 127*b*. The electron beam strikes the molecule 150 and induces a change in the charge state of the molecule 150. The charging module may be one of different types of devices or systems that can be used to induce different charge states for the molecules 150. For example, the charging module 108 used may include a device that generates UV radiation that is thereafter directed at the molecule under investigation.

Once the charge state of the molecule 150 has been changed, the molecule 150, now moving in a radial trajectory controlled by the electric field inside QIT 102, will lose its stationary trajectory pattern. Accordingly, when the molecule's trajectory becomes unstable, it is necessary to re-adjust the driving frequency, Ω, of the driving voltage signal to achieve resonance conditions within the QIT 102 corresponding to the molecule's new charge state.

To visually display the trajectory pattern of the molecule 150, thereby enabling adjustment of the driving frequency of the QIT 102 so as to achieve stationary trajectory patterns for the particle 150, a light source used for generating scattered light is used. When coherent and monochromatic light, such as light generated from a laser, is projected on a particle, it is possible to observe time-dependent fluctuations in the scattered intensity using suitable detectors. Accordingly, the time-dependent motion of a particle, such as the molecule 150, may be observed. Thus, as shown in FIG. 1, a light source 110 illuminates molecule 150 with coherent monochromatic light. A suitable light source is a laser such as an Ar Ion laser. Light scattered by the molecule 150 is subsequently collected by optical lenses 112 and directed to a light capturing device 114, such as a charge-coupled device (CCD) camera. A display device (not shown) coupled to the light capturing device 114 displays the light scattered from the molecule 150, and thus displays the radial trajectory motion of the molecule. Based on the displayed trajectory patterns, adjustments to the driving frequency of the driving voltage signal generated by voltage source 120 may be performed. Such adjustments may be performed manually by a user, or automatically using a processor-based device. When a stationary trajectory pattern is displayed on the display device, the observable characteristics, such as the number of branches on the stationary star pattern, are recorded and used to determine the m/Ze values for the molecule 150.

Having determined the m/Ze values for a particle 150 in each of several charge states, the value of the mass of the molecule can be determined using a procedure such as the one described in U.S. patent application Ser. No. 11/134,616. Briefly, that procedure iteratively tries (i.e., assigns) different mass-to-charge ratio values for the various charge states produced for the molecule 150. The procedure then selects the set of assigned mass-to-charge values that has the lowest standard deviation corresponding to the individually computed masses for each of the molecule's charge states, and the average mass value determined from the individually computed masses in that selected set. It will be understood by those versed in the art that other techniques for determining the mass of the charged molecule 150 from its various charge state values may also be used.

The procedure to determine the mass of the molecule 150, and thus identify the molecule, may be performed using a processor-base device (not shown). Such a processor-based device may include a computer and/or other types of processor-based devices suitable for multiple applications. Such devices can comprise volatile and non-volatile memory elements, and peripheral devices to enable input/output functionality. Such peripheral devices include, for example, a CD-ROM drive and/or floppy drive, or a network connection, for downloading software containing computer instructions to enable general operation of the processor-based device, and for downloading software implementation programs to determine the mass of a molecule 150. Such a processor-based device may be dedicated exclusively to determine the mass of the molecule 150, or it may be utilized to carry out other functions as well.

The quadrupole mass spectrometer, shown in FIGS. 1 and 2, is just one type of mass spectrometer that may be used to perform mass spectrometry analysis on the molecule 150 that has been desorbed from the sample 105 using acoustic radiation. Other types of mass spectrometry apparatus, configured in different ways and comprising, for example, different detection modules, etc., may also be used.

One type of mass spectrometer that may be used is a time-of-flight mass spectrometer. A time-of-flight mass spectrometer uses the differences in transit time through a drift region to distinguish between charged molecules of different masses. An electric field accelerates all ions into a field-free drift region with a kinetic energy of eV, where e is the charge of the molecule and V is the applied voltage. Since a molecule's kinetic energy is equal to $mv^2/2$, lighter molecules will have a higher velocity than heavier molecules and reach the detector at the end of the drift region sooner. Thus, by determining the time of flight of a particular molecule, the mass of the molecule, and thus its identity, may be determined.

Another type of mass spectrometer that may be used in conjunction with the acoustic desorption procedure described herein is a magnetic sector mass spectrometer. In this type of mass spectrometer charged molecules are accelerated through an electric field. An adjustable magnetic field is then used to deflect the path of the traveling molecules in a direction of a flight tube. Only charged molecules having associated centrifugal and centripetal forces that are equal will be detected by a detector located at one end of the flight tube. Charged molecules whose associated centrifugal and centripetal forces are not equal will not be detected. Subsequently, the mass-to-charge ratios of the accelerated charged molecules can be determined based on the measured magnetic field that resulted in the detection of the charged molecules. Accordingly, the mass of the detected charged molecules and their identity can also be determined.

Yet another type of mass spectrometer that may be used is the Fourier transform ion cyclotron resonance mass spectrometer. With this type of mass spectrometer, ionized molecules, having different mass-to-charge ratios, that travel in a constant magnetic field are excited by a pulse of a radio-frequency electric field applied perpendicularly to the magnetic field. The applied electric field causes the different molecules to move in cyclotron motion having corresponding cyclotron frequencies. The excited cyclotron motion of the ionized molecules is subsequently detected on receiver plates as a time domain signal that contains all the excited cyclotron frequencies of the various detected ionized molecules. A Fourier transformation is then performed on the time domain signal to obtain the frequency domain representation of the time-domain signal. The resultant Fourier transform is converted to a mass spectrum which enables identification of the various charged molecules being investigated.

Other types of mass spectrometers, including ion mobility mass spectrometer analysis, other types of ion trap mass spectrometers, etc., may also be used in conjunction with the acoustic desorption technique(s) described herein.

Detection of the charged molecules to determine the molecules' mass-to-charge values may be performed with suitable detectors and/or detection techniques. These include charged particle devices with secondary electron ejection such as a microchannel plate, a channeltron or an electron multiplier device, detectors based on energy measurement such as superconducting tunneling devices, detectors based on image current measurement such as charge sensitive devices, detectors based on mass changes such as cantilever or cantilever microarray devices, detectors for use with light scattering techniques, detectors used for laser-induced fluorescence detection techniques, and other types of detectors. Some detectors would be more suitable for certain mass spectrometers. For example, detectors based on light scattering techniques would be suitable for particle detection with a quadrupole ion trap mass spectrometer.

EXPERIMENTS

To demonstrate the efficacy of acoustic desorption for mass spectrometry analysis, a mass spectrometer apparatus similar to the apparatus shown in FIGS. 1 and 2 was used to analyze a single whole-cell bioparticle. A sample of *Escherichia coli* was placed on a semiconductor substrate (a 0.5 mm thick Si wafer). The sample was not placed in a matrix compound. An Nd-YAG laser beam was shined onto the backside of the substrate. The laser wavelength used was 532 nm and the laser energy was approximately 30 mJ per laser pulse. Since the laser beam was shined on the backside of the sample holding substrate (i.e., it was not directed at the sample itself), the desorption process was principally caused by the acoustic forces induced in the substrate by the laser illumination. Subsequently, desorbed molecules from the sample were trapped in a quadrupole ion trap.

An argon ion laser beam was used to illuminate the trapped cells to produce scattered laser light. The wavelength of the argon ion laser used was 488 nm with a laser power of ~100 mW. An optical lens was used to enhance the collection of the scattered laser light, which was subsequently detected by a photon detector such as a CCD device. By adjusting the trap-driving frequency to cause resonance motion for the cells, the mass-to-charge ratio of the desorbed cells was obtained. The mass of the desorbed molecule was obtained by using electron gun to alter the charge states of the molecules, and applying the mass determination procedure described in U.S. patent application Ser. No. 11/134,616 to compute the molecule's mass. Although an electron gun was used to alter the charge state of the molecules once those molecules were trapped in QIT, no ionization or charging procedure was otherwise performed on the molecules. Thus, the molecules trapped in the QIT were molecules with born-charges that were introduced into the QIT through the acoustic desorption process.

Figure 4:
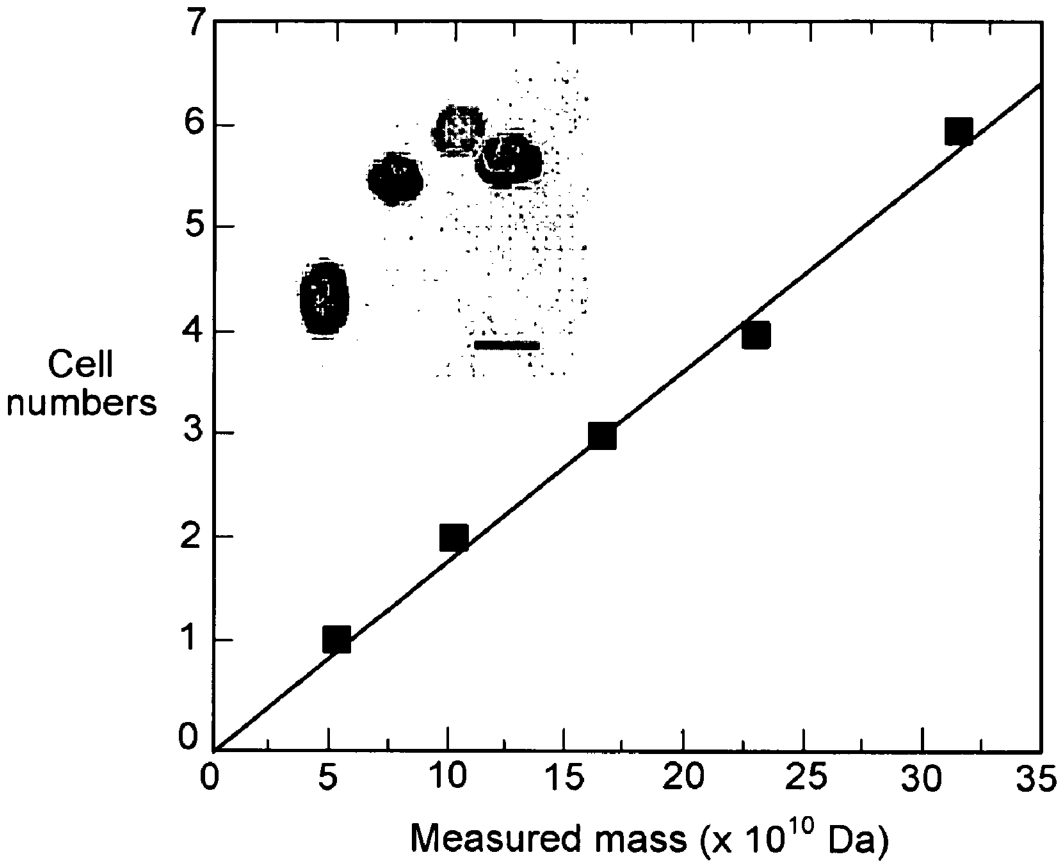
FIG. 4 is a plot of the cell number ($N_c$) versus the mass m for clusters of detected *Escherichia coli* whole cells detected with a mass spectrometer that used laser-induced acoustic desorption.

FIG. 4 is a plot of the cell number ($N_c$) versus the mass m for clusters of detected *Escherichia coli* whole cells desorbed using laser-induced acoustic desorption. An image produced using an electron microscope of the *Escherichia coli* molecules is shown in the inset of FIG. 4. The scale bar of the inset image is 1 μm. Biological whole-cell molecules are often introduced into the mass spectrometer as clusters of cells and thus the detected mass-to-charge corresponds to clusters of molecules rather than to individual molecules. As can be seen, the plot of FIG. 4 was used to determine an average mass of $m/N_c=5.35\pm0.24\times10^{10}$ Da for a dehydrated *Escherichia coli* cell. It is known that the bacterium prior to dehydration contains 70~80% of water. Thus, this measured mass suggests that the wet weight of the cell is ~0.35 pg, which agrees well with the estimate 0.31 pg based on the size (~1 μm long×~0.6 μm in diameter) and the density (~1.1 g/cm$^3$) of the bacterial particle. Thus, laser-induced acoustic desorption enabled an accurate mass determination and identification of the molecules (i.e., the *E-coli* cells) analyzed by the mass spectrometer.

Figure 5:
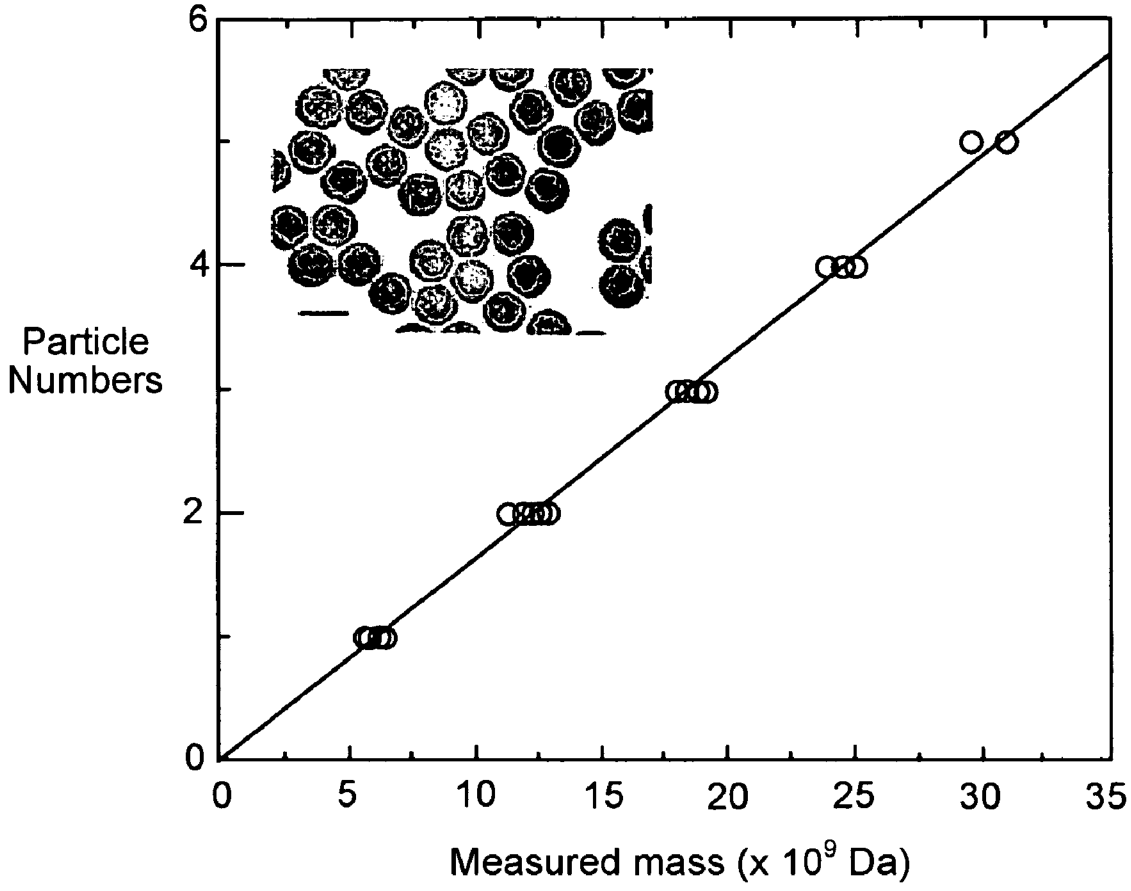
FIG. 5 is a plot of the particle number versus the mass m for clusters of detected polystyrene nanospheres detected with a mass spectrometer that used laser-induced acoustic desorption.

A similar mass spectrometry analysis using acoustic desorption was performed, on polystyrene nanoparticles having a diameter of 0.269±0.007 nm. FIG. 5 is a plot of the particle number versus the mass m for clusters of detected polystyrene nanospheres desorbed using laser-induced acoustic desorption. As can be seen, the plot of FIG. 5 was used to determine an average mass of $6.17\pm0.18\times10^9$ Da. This average value compares well with the average mass value of $6.5\pm0.4\times10^9$ Da, calculated from the diameter 0.269 μm and a density value of 1.055 g/cm$^3$ for a single polystyrene nanoparticle. An image produced using an electron microscope of the polystyrene particles is shown in the inset of FIG. 5. The scale bar of the inset image is 300 nm.

Figure 6:
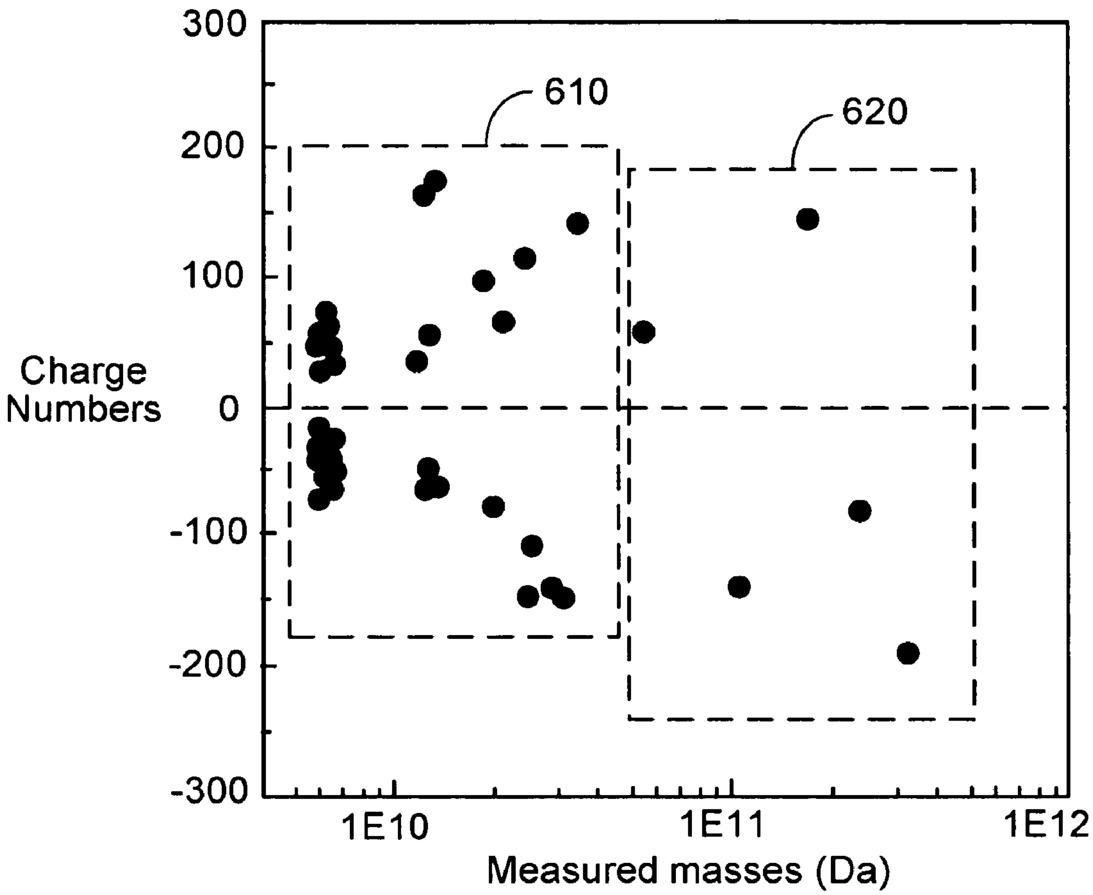
FIG. 6 is a graph showing the charge state distribution of molecules evaporated from a 0.5 mm thick Si wafer by laser-induced acoustic desorption.

FIG. 6 is a graph showing the charge state distribution of particles evaporated from a 0.5 mm thick Si wafer by laser-induced acoustic desorption. The two samples used in the measurements were 0.269-nm polystyrene nanoparticles (shown in the area 610 of FIG. 6) and *E. coli* molecules (shown in the area 620). As can be seen, there is a near symmetrical distribution of desorbed charged molecules introduced into the mass spectrometer for each of the polystyrene nanoparticles and the *E. coli* molecules. These charge distributions of the desorbed molecules were achieved without having to ionize the molecules as is generally done in conventional mass spectrometry procedures. Although, as noted, an ionization module may be used to charge molecules desorbed using the acoustic desorption procedure described herein, FIG. 6 shows that the acoustic desorption procedure can provide molecules with born-charges from the sample without the need to perform a separate ionization procedure.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for producing gas phase molecules for mass spectrometry analysis, the method comprising:

providing a sample of molecules on a first surface of a solid substrate, the sample of molecules including born-charge molecules each having a mass greater than 1,000 Daltons and being characterized by a charge distribution;

directing an energy beam to a second surface of the solid substrate to break bonds between molecules of a material from which the solid substrate is constructed to generate acoustic waves, the energy beam having a beam fluence above an ablation threshold of the solid substrate;

transferring the acoustic waves from the second surface to the first surface of the solid substrate and to the sample of molecules to desorb at least some of the molecules from the sample to form the gas phase molecules, the desorbed molecules comprising one or more of the born-charge molecules and having a charge distribution that is substantially the same as the charge distribution of the born-charge molecules before they were desorbed; and performing mass spectrometry analysis on the desorbed molecules.

2. The method of claim 1, wherein generating acoustic waves includes generating acoustic waves using at least one of: a continuous sonic source, an ultrasound source, or a pulsed source.

3. The method of claim 1, wherein transferring the acoustic waves is performed without concurrently directing ionizing radiation at the molecules.

4. The method of claim 1, wherein performing mass spectrometry analysis includes performing at least one of: time-of flight mass spectrometry analysis, quadrupole mass spectrometry analysis, ion trap mass spectrometry analysis, magnetic sector mass spectrometry analysis, Fourier-transform ion cyclotron resonance mass spectrometry analysis, or ion mobility mass spectrometry analysis.

5. The method of claim 1, wherein providing the sample of molecules comprises placing the sample of molecules on a first surface of a substrate.

6. The method of claim 1 in which providing the sample of molecules comprises providing the sample of molecules on the solid substrate without containing the sample of molecules in a liquid.

7. The method of claim 1, comprising propagating the acoustic waves from a location of the solid substrate where the acoustic waves are induced to the sample of molecules without passing through a liquid.

8. The method of claim 1 in which providing the sample of molecules on a solid substrate comprises placing the sample of molecules on a silicon wafer.

9. The method of claim 1 in which providing the sample of molecules on a solid substrate comprises placing at least one of biomolecules, biomolecular complexes, organelles, or whole cells-on the solid substrate.

10. The method of claim 1 in which directing the acoustic waves onto the sample of molecules is performed without focusing the acoustic waves toward a focus point.

11. The method of claim 1 in which the energy beam comprises a laser beam.

12. The method of claim 1 in which the energy beam comprises a particle beam.

13. The method of claim 1 in which the sample of molecules includes born-charge molecules each having a mass greater than 10,000 Daltons and being characterized by a charge distribution, and the desorbed gas phase molecules comprise one or more of the born-charge molecules each having a mass greater than 10,000 Daltons.

14. The method of claim 1 in which the sample of molecules includes born-charge molecules each having a mass greater than 100,000 Daltons and being characterized by a charge distribution, and the desorbed gas phase molecules comprise one or more of the born-charge molecules each having a mass greater than 100,000 Daltons.

15. The method of claim 1 in which providing the sample of molecules on a solid substrate comprises placing at least one of amorphous materials, organic polymers, micro-sized particles, or microplasma on the solid substrate.

16. The method of claim 1 in which providing the sample of molecules on a solid substrate comprises placing at least one of adsorbates, nano-sized particles, aerosols, metal clusters, metal particles, inorganic clusters, or inorganic particles on the solid substrate.

17. A method for producing gas phase molecules for mass spectrometry analysis, the method comprising:

placing a sample of molecules on a first surface of a solid substrate, the sample including born-charge molecules each having a mass greater than 1,000 Daltons and being characterized by a charge distribution;

applying an electron beam at another surface of the solid substrate to break bonds between molecules of a material from which the solid substrate is constructed to generate acoustic waves, the electron beam having a beam fluence above an ablation threshold of the solid substrate;

transferring the acoustic waves from the first surface to another surface of the solid substrate to desorb at least some of the molecules from the sample to form gas phase molecules, such that the desorbed molecules comprise one or more of the born-charge molecules and have a charge distribution that is substantially the same as the charge distribution of the sample of molecules; and performing mass spectrometry analysis on the desorbed molecules.

* * * * *